(12) United States Patent
Wu et al.

(10) Patent No.: US 11,303,777 B2
(45) Date of Patent: Apr. 12, 2022

(54) SYSTEM, METHOD AND APPARATUS FOR DIGITAL WATERMARKING

(71) Applicant: HUAWEI TECHNOLOGIES CO., LTD., Guangdong (CN)

(72) Inventors: Teng Wu, Waterloo (CA); Alan Pak-Lun Ho, Unionville (CA); Thomas Daniel Wallace, Waterloo (CA); Mustafa Mohamad, Kitchener (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 70 days.

(21) Appl. No.: 16/986,948

(22) Filed: Aug. 6, 2020

(65) Prior Publication Data

US 2022/0046141 A1    Feb. 10, 2022

(51) Int. Cl.
*H04N 1/32* (2006.01)
*G06T 1/00* (2006.01)

(52) U.S. Cl.
CPC ......... *H04N 1/32272* (2013.01); *G06T 1/005* (2013.01); *G06T 1/0021* (2013.01); *H04N 1/32219* (2013.01)

(58) Field of Classification Search
CPC ............ H04N 1/32272; H04N 1/32219; G06T 1/0021; G06T 1/005
See application file for complete search history.

(56) References Cited

U.S. PATENT DOCUMENTS

2005/0169497 A1 *  8/2005  Gustafson ............... G06T 1/005
                                                            382/100

OTHER PUBLICATIONS

Poljicak et al., "Discrete Fourier transform-based watermarking method with an optimal implementation radius", Journal of Electronic Imaging, 20(3), 2011, 033008.
Pereira et al., "Fast robust template matching for affine resistant image watermarks", International Workshop on Information Hiding, Springer, Berlin, Heidelberg, 1999, pp. 200-210.

* cited by examiner

*Primary Examiner* — Christopher Wait
(74) *Attorney, Agent, or Firm* — BCF LLP

(57) ABSTRACT

The disclosed systems, structures, and methods are directed to a digital watermarking system comprising: a data separator configured to receive a digital data file and segregate the digital data file into a message component and a data component, in which the message component includes a message, and the data component includes a data file; a message pipeline configured to process the message; a data pipeline configured to process the data file; a watermark pipeline configured to embed the processed message file onto the processed data file; and an inverse process pipeline configured to inverse the process applied by the data pipeline while processing the data file and generate a watermarked data file.

24 Claims, 14 Drawing Sheets

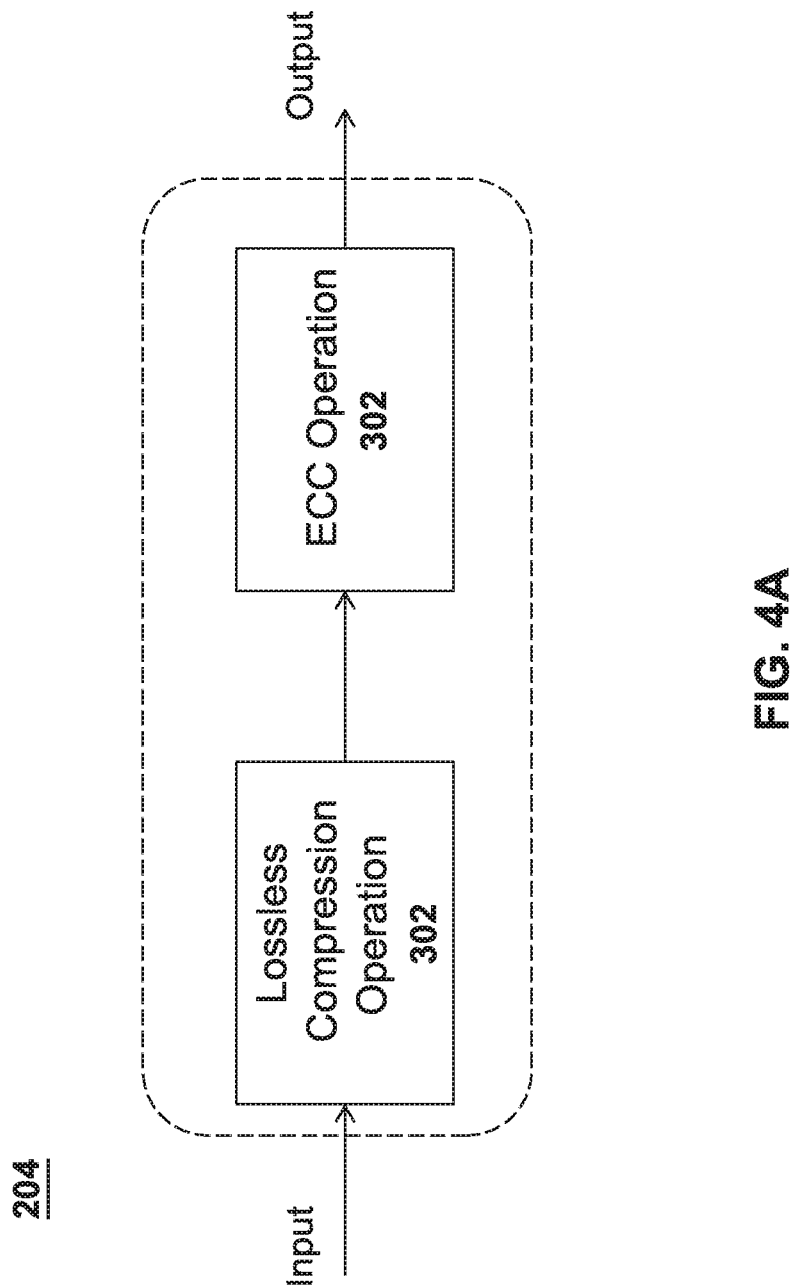

SYSTEM, METHOD AND APPARATUS FOR DIGITAL WATERMARKING

CROSS-REFERENCE TO RELATED APPLICATIONS

This is the first application filed for the instantly disclosed technology.

FIELD OF THE INVENTION

The present invention generally relates to digital processing and, in particular, to a system, method, and apparatus for digital watermarking.

BACKGROUND

A typical digital watermarking system will normally perform several different tasks that may include but are not limited to: message compression, message encryption, message encoding, image decoding, image transformations, watermark embedding, image encoding or the like. It is challenging to design an efficient digital watermarking system from a finite set of known tasks. The challenge is further exacerbated in order to design a digital watermarking system that is sufficiently adaptive to accommodate changing technologies and/or requirements associated with the various tasks.

Another challenge associated with typical digital watermarking systems is to ensure that the watermark is robust. To be considered robust, the watermark should be difficult (if not impossible) to remove the watermark from any digital file (e.g. image, video, audio, or the like). For example, considering an image, the watermark should not be removed by simple means, such as transcoding (i.e., converting an image from one format to another), compression (i.e., sacrificing quality for file size or transmission efficiency), or geometric modification (e.g., cropping, rotating, etc.). As such, if JPEG compression is used to reduce the size of a watermarked image (in bytes) but at the same time prevents the watermark from being read, then the watermark is weak or not sufficiently robust for compression.

A common strategy to overcome weak watermarking is to transform a digital file from the spatial domain to the frequency domain before watermarking. Unfortunately, transformations from the spatial domain to the frequency domain are computationally expensive operations, and depending on computer hardware can be prohibitively slow. Moreover, the size of the digital file tends to be a major contributing factor when it comes to the processing time required to compute a frequency transform, which can bottleneck the watermarking system.

Further, the watermark provides value if it cannot be removed, and detection of the watermark is the first step towards the removal. While most watermarking techniques are visually imperceptible (i.e., undetectable by the human eye), using statistical analysis a computer program can identify similarities amongst watermarked digital files. Using this statistical analysis, watermark embedding algorithms can be reverse engineered and tools can be developed to easily remove new watermarks from the additional digital files. This is typically known as a correlation attack, and it can take place when an adversary has access to several watermarked digital files that contain the same message. In order to circumvent the correlation attack, a watermarking system typically employs an encryption algorithm to scramble the message in such a way as to make it appear as random noise. Furthermore, by using different keys, the same message will be scrambled differently each time. While this approach is effective, it requires the system to manage many keys.

With that being said, there is a need to develop a digital watermarking system: 1) which is efficient, flexible, extensible, scalable, and portable; 2) which improves the processing time required to compute a watermark on large images; 3) reduces the number of keys required to prevent correlation attacks.

SUMMARY

The present disclosure generally provides a digital watermarking system comprising a data separator configured to receive a digital data file and segregate the digital data file into a message component and a data component, in which the message component includes a message, and the data component includes a data file; a message pipeline configured to process the message; a data pipeline configured to process the data file; a watermark pipeline configured to embed the processed message file onto the processed data file; and an inverse process pipeline configured to inverse the process applied by the data pipeline while processing the data file and generate a watermarked data file.

In accordance with other aspects of the present disclosure, the digital watermarking system, wherein the digital data file further includes a set of arguments, the set of arguments specify at least one of: a processing criteria for the message pipeline to process the message, a processing criteria for the data pipeline to process the data file, a processing criteria for the watermark pipeline to embed the processed message file onto the processed data file, or a processing criteria for the inverse process pipeline to inverse process applied by the data pipeline while processing the data file.

In accordance with other aspects of the present disclosure, the digital watermarking system, wherein: the message pipeline is further configured to process the message in accordance with the set of arguments, the data pipeline is further configured to process the data file in accordance with the set of arguments, the watermark pipeline is further configured to embed the processed message file onto the processed data file in accordance with the set of arguments, and the inverse process pipeline is further configured to inverse process applied by the data pipeline while processing the data file in accordance with the set of arguments.

In accordance with other aspects of the present disclosure, the digital watermarking system is further configured to add or remove an operation in the message pipeline, the data pipeline, the watermark pipeline or the inverse process pipeline.

In accordance with other aspects of the present disclosure, the digital watermarking system, wherein the message pipeline is further configured to encrypt the message using the Paillier probabilistic encryption algorithm.

In accordance with other aspects of the present disclosure, the digital watermarking system, wherein the message pipeline uses a public key to encrypt the message.

In accordance with other aspects of the present disclosure, the digital watermarking system, wherein the data file includes at least one of a video file, an audio file or an image file.

In accordance with other aspects of the present disclosure, the digital watermarking system wherein if the data file is the image file: the data pipeline is further configured to: create a copy of the original image file and provide the copied image file to the inverse process pipeline, shrink the dimensions of the original image file, create a copy of the shrunk image file and provide the copied shrunk image file to the inverse process pipeline, and convert the shrunk image file from spatial domain to frequency domain and provide the frequency domain representation file to the watermark pipeline; the watermark pipeline is further configured to: embed the processed message file onto the frequency domain representation file, generate a watermarked frequency domain representation file, and provide the watermarked frequency domain representation file to the inverse process pipeline; and the inverse process pipeline is further configured to: convert the watermarked frequency domain representation file from frequency domain to spatial domain to generate a watermarked spatial domain shrunk image file, subtract the copied shrunk image file from the watermarked spatial domain image file to extract a watermarked region from the watermarked spatial domain shrunk image file, and increase the dimensions of the extracted watermarked region to generate an enlarged watermark region, and add the enlarged watermark region to the original image file.

In accordance with other aspects of the present disclosure, the digital watermarking system wherein: the data pipeline is further configured to: converting the image file from polar to Cartesian coordinate; convert the coordinate transformed image file from spatial domain to frequency domain and provide the frequency domain representation file to the watermark pipeline; the watermark pipeline is further configured to: select an arc in top left and right quadrants of the frequency domain representation file, select pixels around the arc in accordance with a separation operation; and perform differential encoding on the selected pixels In accordance with other aspects of the present disclosure, the digital watermarking system, wherein for each bit to be encoded: the digital watermark pipeline uses two pixels from the selected pixels, a first pixel from the top right quadrant and second pixel from the top left quadrant, and the first pixel and the second pixel are dual of each other and are separated by 90 degrees counter clockwise away from each other.

In accordance with other aspects of the present disclosure, the digital watermarking system, wherein the data file is an empty data file.

In accordance with other aspects of the present disclosure, the digital watermarking system further includes a batch processing pipeline configured to mix the watermarked data file to a second data file, the second data file includes at least one of an image file, a video file or an audio file.

In accordance with another broad aspect of the present disclosure, there is provided a digital watermarking method comprising: receiving, by a data separator, a digital data file; segregating the digital data file into a message component and a data component, the message component includes a message, and the data component includes a data file; processing, by a message pipeline, the message; processing, by a data pipeline, the data file; embedding, by a watermark pipeline, the processed message file onto the processed data file; and inversing, by an inverse process pipeline, process applied by the data pipeline while processing the data file and generating a watermarked data file.

In accordance with other aspects of the present disclosure, the digital watermarking method, wherein the digital data file further includes a set of arguments, the set of arguments specify at least one of: a processing criteria for the message pipeline to process the message, a processing criteria for the data pipeline to process the data file, a processing criteria for the watermark pipeline to embed the processed message file onto the processed data file, or a processing criteria for the inverse process pipeline to inverse process applied by the data pipeline while processing the data file.

In accordance with other aspects of the present disclosure, the digital watermarking method, wherein: processing the message, by the message pipeline, is in accordance with the set of arguments, processing the data file, by the data pipeline, is in accordance with the set of arguments, embedding the processed message file onto the processed data file, by the watermark pipeline, is in accordance with the set of arguments, and inversing the process applied by the data pipeline while processing the data file, by the inverse process pipeline, is in accordance with the set of arguments.

In accordance with other aspects of the present disclosure, the digital watermarking method further comprising adding or removing an operation in the message pipeline, the data pipeline, the watermark pipeline or the inverse process pipeline.

In accordance with other aspects of the present disclosure, the digital watermarking method, wherein the message is encrypted using the Paillier probabilistic encryption algorithm.

In accordance with other aspects of the present disclosure, the digital watermarking method, wherein encrypting the message uses a public key.

In accordance with other aspects of the present disclosure, the digital watermarking method, wherein the data file includes at least one of a video file, an audio file or an image file.

In accordance with other aspects of the present disclosure, the digital watermarking method if the data file is the image file, further comprises: creating a copy of the original image file and providing the copied image file to the inverse process pipeline, shrinking the original image file, creating a copy of the shrunk image file and providing the copied shrunk image file to the inverse process pipeline, and converting the shrunk image file from spatial domain to frequency domain and providing the frequency domain representation file to the watermark pipeline; embedding the processed message file onto the frequency domain representation file, generating a watermarked frequency domain image file, and providing the watermarked frequency domain representation file to the inverse process pipeline; and converting the watermarked frequency domain representation file from frequency domain to spatial domain to generate a watermarked spatial domain image file, subtracting the copied shrunk image file from the watermarked spatial domain image file to extract a watermarked region in the watermarked spatial domain image file, and increasing the dimensions of the extracted watermarked region to generate an enlarged watermark region, and adding the enlarged watermark region to the original image file.

In accordance with other aspects of the present disclosure, the digital watermarking method further comprises: converting the image file from polar to Cartesian coordinate; converting the coordinate transformed image file from spatial domain to frequency domain and providing the frequency domain representation file; selecting an arc in top left and right quadrants of the frequency domain image file; selecting pixels around the arc in accordance with a separation operation; and performing differential encoding on the selected pixels.

In accordance with other aspects of the present disclosure, the digital watermarking method, wherein for each bit to be encoded: two pixels from the selected pixels are used, a first pixel from the top right quadrant and second pixel from the top left quadrant, and the first pixel and the second pixel are dual of each other and are separated by 90 degrees counter clockwise away from each other.

In accordance with other aspects of the present disclosure, the digital watermarking method, wherein the data file is an empty data file.

In accordance with other aspects of the present disclosure, the digital watermarking method further includes mixing, by a batch processing pipeline, the watermarked data file to a second data file, the second data file includes at least one of an image file, a video file or an audio file.

BRIEF DESCRIPTION OF THE FIGURES

Further features and advantages of the present disclosure will become apparent from the following detailed description, taken in combination with the appended drawings, in which:

FIGS. 4A-4B illustrate a representative message pipeline, in accordance with various embodiments of the present disclosure;

Figure 1:
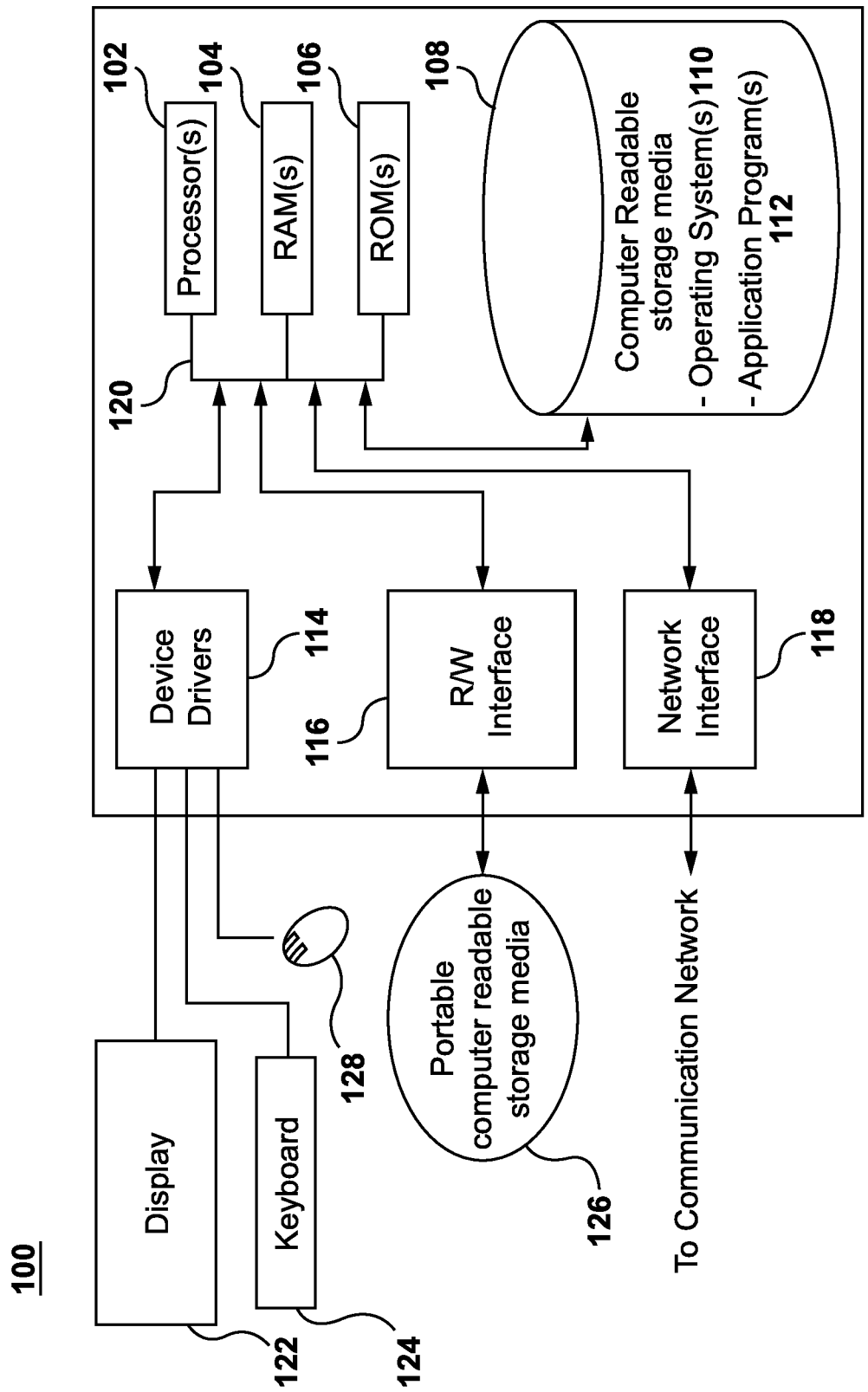
FIG. 1 depicts a high-level block diagram of components of an electronic device, in accordance with various embodiments of the present disclosure.

It is to be understood that throughout the appended drawings and corresponding descriptions, like features are identified by like reference characters. Furthermore, it is also to be understood that the drawings and ensuing descriptions are intended for illustrative purposes only and that such disclosures do not provide a limitation on the scope of the claims.

DETAILED DESCRIPTION

The instant disclosure is directed to address at least some of the deficiencies of the current technology. In particular, the instant disclosure describes a system and method for digital watermarking.

In the context of the present specification, "electronic device" is any computer hardware that is capable of running software appropriate to the relevant task at hand. In the context of the present specification, in general the term "electronic device" is associated with a user of the electronic device. Thus, some (non-limiting) examples of electronic devices include personal computers (desktops, laptops, netbooks, etc.), smartphones, and tablets, as well as network equipment such as routers, switches, and gateways. It should be noted that a device acting as an electronic device in the present context is not precluded from acting as a server to other electronic devices. The use of the expression "an electronic device" does not preclude multiple electronic devices being used in receiving/sending, carrying out or causing to be carried out any task or request, or the consequences of any task or request, or steps of any method described herein.

In the context of the present specification, unless provided expressly otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first processor" and "third processor" is not intended to imply any particular order, type, chronology, hierarchy or ranking (for example) of/between the server, nor is their use (by itself) intended to imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

In the context of the present specification, the expression "information" includes information of any nature or kind whatsoever capable of being stored in a database. Thus information includes, but is not limited to audiovisual works (images, movies, sound records, presentations, etc.), data (location data, numerical data, etc.), text (opinions, comments, questions, messages, etc.), documents, spreadsheets, etc.

It will be understood that when an element is referred to as being "connected" or "coupled" to another element, it can be directly or indirectly connected or coupled to the other element or intervening elements that may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is only intended to describe particular representative embodiments and is not intended to be limiting of the present technology. As used herein, the singular forms "a," "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules, or units which are implied to be software, may be represented herein as any combination of flowchart elements or other elements indicating performance of process steps and/or textual description. Such modules may be executed by hardware that is expressly or implicitly shown.

With these fundamentals in place, the instant disclosure is directed to address at least some of the deficiencies of the current technology. In particular, the instant disclosure describes a system and method for digital watermarking.

FIG. 1 depicts a high-level block diagram of components of an electronic device 100, in accordance with various embodiments of the present disclosure. It should be appreciated that FIG. 1 provides only an illustration of one implementation of electronic device 100 and does not imply any limitations with regard to the environments in which different embodiments may be implemented. Many modifications to the depicted environment can be done to implement electronic device 100 without departing from the principles presented herein. Electronic device 100 may be a server, a desktop computer, a laptop computer, a tablet, a smart-phone, a personal digital assistant or any device that may be configured to implement the present technology, as should be understood by a person skilled in the art.

As shown, electronic device 100 employs one or more processors 102, one or more computer-readable random access memories (RAMs) 104, one or more computer-readable read only memories (ROMs) 106, one or more computer-readable storage media 108, device drivers 114, a read/write (R/W) driver interface 116, a network interface 118, all interconnected over a communication fabric 120. Communication fabric 120 may be implemented with any architecture designed for passing data and/or control information between processors (such as microprocessors, communications and network processors, etc.), system memory, peripheral devices, and any other hardware components within a system.

One or more operating systems 110 and one or more application programs 112 are stored on one or more of computer-readable storage media 108 for execution by one or more of the processors 102 via the one or more of respective RAMs 104 (which typically include a cache memory). In the illustrated embodiment, each of computer-readable storage media 108 maybe a magnetic disc storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

R/W driver interface 116 reads from and writes to one or more portable computer-readable storage media 126. Application programs 112 may be stored on one or more of portable computer-readable storage media 126, read via respective R/W driver interface 116 and loaded into respective computer-readable storage media 108.

Further, network interface 118 may be based on a TCP/IP adapter card or wireless communication adapter (such as a 4G wireless communication adapter using OFDMA technology). Application programs 112 on electronic device 100 may be downloaded to electronic device 100 from an external computer or external storage device via a communication network (for example, the Internet, a local area network or other wide area network or wireless network) and network interface 118. From network interface 118, application programs 112 may be loaded onto computer-readable storage media 108. Electronic device 100 may connect to routers, firewalls, switches, gateway computers and/or edge servers of the communication network using copper wires, optical fibers, wireless transmission, and the like.

Electronic device 100 may also include a display screen 122, a keyboard or keypad 124, and a computer mouse or touchpad 128. Device drivers 114 may interface with display screen 122 for imaging, with keyboard or keypad 124, with computer mouse or touchpad 128, and/or with display screen 122 (which may be a touch sensitive display) for alphanumeric character entry and user selections. Device drivers 114, R/W driver interface 116 and network interface 118 may comprise hardware and software (stored on computer-readable storage media 108 and/or ROM 106).

Typical digital watermarking systems perform various operations on the message component (to be watermarked) and data component (e.g. digital image files, digital audio files, digital video files or the like) to be watermarked, both before and after watermarking. Such as, in certain situations, the message component requires compression, encryption, error correction coding, or the like. In other situations, data component requires decoding, mathematical transforms such as frequency transforms, inverse mathematical transforms, encoding or the like.

It is to be noted that not all typical watermarking systems perform the same set of operations. By way of example, some of the typical watermarking systems may perform encryption operation over the message component, while other typical watermarking systems may not perform any encryption operation. In other examples, some of the typical watermarking systems may perform frequency transformation on the data component, while other typical watermarking systems may perform geometric transformations. In yet other examples, some of the typical watermarking systems may perform Huffman encoding over the message component while other typical watermarking systems may perform the Lempel-Ziv-Markov chain algorithm (LZMA) encoding. In yet other examples, some of the typical watermarking systems may perform discrete cosine transformation (DCT) on the data component while other typical watermarking systems may perform discrete Fourier transformation (DFT).

Typical watermarking systems are too rigid and cannot adapt to the required changes. Generally, it requires a lot of time and hardware infrastructure to architect new watermarking systems, every time there is a change required in terms of set of operations and algorithms. To this end, there is a requirement to develop a watermarking system that is: Efficient, Flexible, Extensible, Scalable, and Portable.

Figure 2:
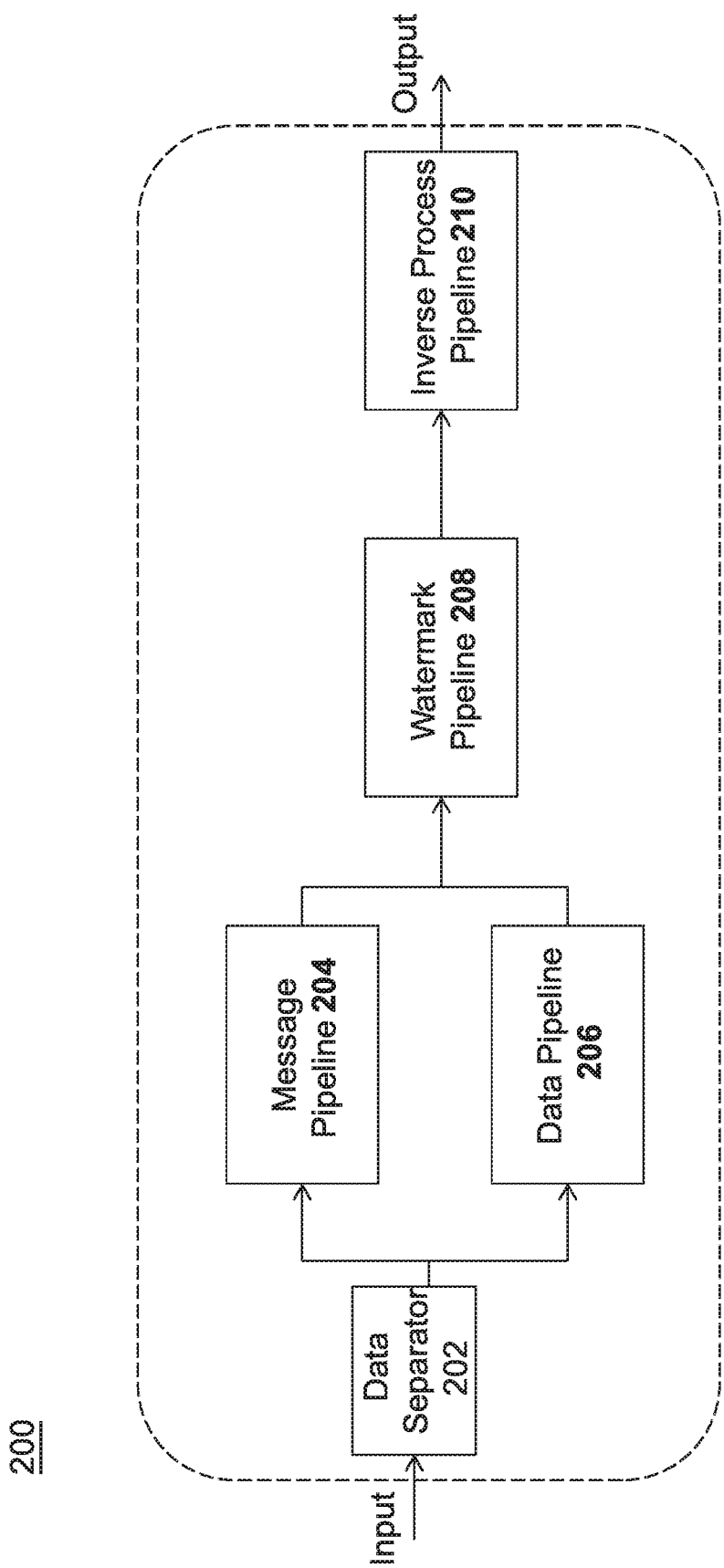
FIG. 2 illustrates a high level functional block diagram of a digital watermarking system, in accordance with various embodiments of present disclosure.

With this said, FIG. 2 illustrates a high level functional block diagram of a digital watermarking system 200, in accordance with various embodiments of present disclosure. In certain embodiments, digital watermarking system 200 may be implemented on the electronic device 100. As shown, digital watermarking system 200 may comprise a data separator 202, a message pipeline 204, a data pipeline 206, a watermark pipeline 208, and an inverse process pipeline 210. In certain non-limiting embodiments, data separator 202, message pipeline 204, data pipeline 206, watermark pipeline 208, and inverse process pipeline 210 may be implemented on one or more processors 102 with one or more application programs 112 being stored on one or more of computer-readable storage media 108 for execution by one or more of the processors 102 via the one or more of respective RAMs 104 (which typically include a cache memory) as discussed above (in FIG. 1) to perform various associated functionalities. It is to be noted that digital watermarking system 200 may include other components, units and modules. Such components, units and modules have not been depicted for the purpose of simplicity.

Input to digital watermarking system 200 may be a queue of digital data files, such as for examples, digital image files, digital audio files, digital video files or the like. In particular, digital data files mainly includes two components: 1) a message component (e.g. a character string, a bit stream, or the like) to be watermarked, and 2) a data component (either containing or referencing the digital image files, digital audio files, digital video files or the like) onto which the message component is to be watermarked.

In certain embodiments, the digital data files may also include a third component, which may be a set of arguments specifying processing criteria on how the digital data files should be processed. The set of arguments may be associated with the message component or with the data component. If the set of arguments is associated with the message component then the set of arguments may specify processing criteria, for example, compression, encryption, encoding or the like techniques to be applied on the message component. On the other hand, if the set of arguments is associated with the data component then the set of arguments may specify processing criteria, for example, which type of algorithm is to be applied on the data component such as DCT, or DFT or the like. With this said, digital data files may be defined as a triplet (i.e., a 3-tuple) to be: a message component, a data component, and a set of arguments.

The digital data files may be provided to digital watermarking system 200 for watermarking. The digital data files may be received by the data separator 202. In certain embodiments, data separator 202 may be configured to segregate the digital data files into the message component and the data component. Data separator 202 may provide the message component to message pipeline 204 and the data component to data pipeline 206. It is contemplated that if the digital data files include the set of arguments associated with the message component, the set of arguments may be forwarded to message pipeline 204 along with the message component. Also, if the digital data files include the set of arguments associated with the data component, the set of arguments may be forwarded to data pipeline 206 along with the data component.

Message pipeline 204 may be configured to process the message component by performing various operations related to preparing a message for watermarking. Examples of such operations may include but are not limited to compression, encryption, encoding or the like. In a similar manner, data pipeline 206 may be configured to process the data component by performing various operations on the data components. By way of example, if the data component is an image file, data pipeline 206 may be configured to deconstruct the image file into a state suitable for watermarking. For example, the image file may be converted from RGB (red, green, blue) colour space to grayscale then transformed to the frequency domain before embedding the message. It is to be noted data pipeline 206 may also be configured to process any digital video or audio files without limiting the scope of the present disclosure.

Message pipeline 204 and data pipeline 206 may provide the processed message file and processed data file respectively to watermark pipeline 208. Watermark pipeline 208 may be configured to perform embedding of the processed message file into the processed data file. In certain embodiments, the process of watermarking may include any suitable algorithms (e.g. any proprietary algorithms) that must remain secret in order to protect the integrity of the watermark. The watermarked data file is forwarded to the inverse process pipeline 210. Inverse process pipeline 210 may be configured to reverse any processes (or transformation) applied inside the data pipeline 206. By way of example, inverse process pipeline 210 may transform the image files from the frequency domain to the spatial domain and converting from grayscale to RGB.

Figure 3:
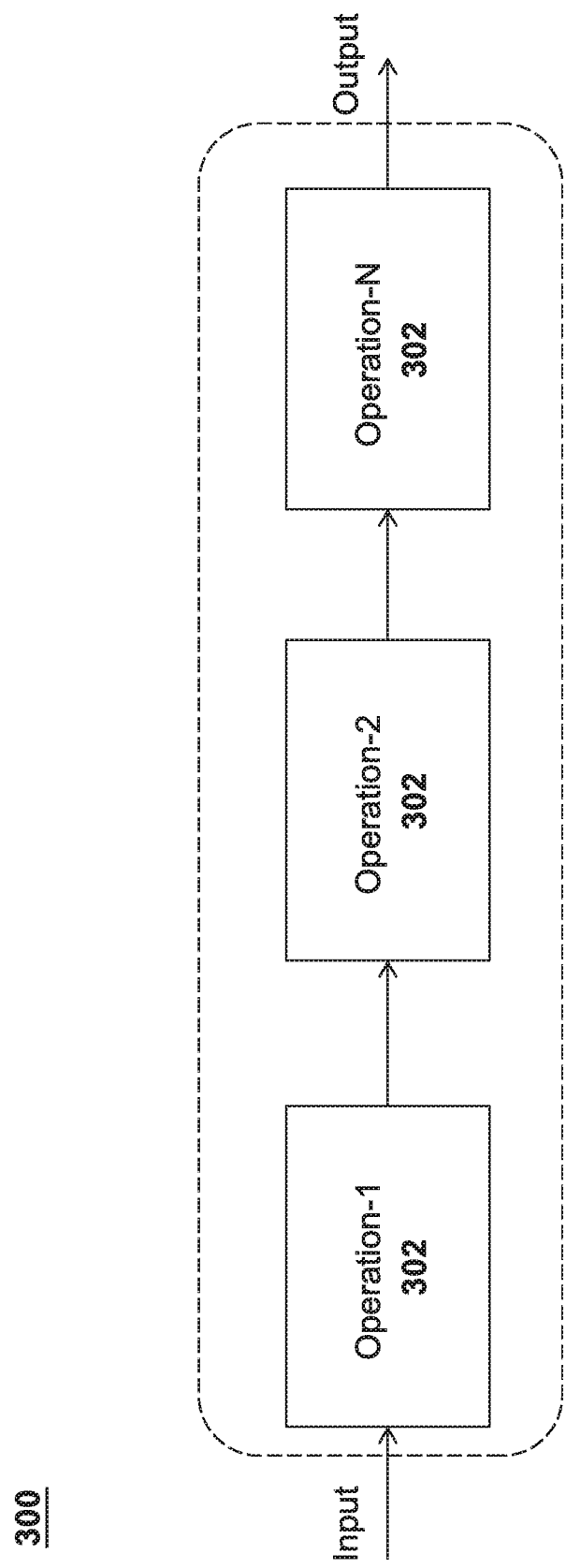
FIG. 3 illustrates a high-level functional diagram of a generic pipeline, in accordance with various embodiments of the present disclosure.

In general, a pipeline may be described as a series of independent operations, coupled together in such a manner that the output of one operation may be input to another operation. FIG. 3 illustrates a high-level functional diagram of a generic pipeline 300, in accordance with various embodiments of the present disclosure. As shown, generic pipeline 300 may include operations 302 coupled with each other. It is to be noted that generic pipeline 300 may include other components but have not been shown for the purpose of simplicity.

In certain embodiments, generic pipeline 300 may be instructed to operate dynamically if the input to the generic pipeline includes a set of arguments. By way of example, the set of arguments may indicate a preference of a particular operation or algorithm to be implemented on the input.

Furthermore, each pipeline may operate independent (i.e., in parallel) of any other pipeline, as well as the execution of one operation is independent of another. For example, when operation-2 302 receives output of operation-1 302 and there may be more digital files queued at the input of operation-1 302, operation-1 302 may begin processing the next digital file in the queue without having to wait on operation-2 302 to start processing the current output of operation-1 302. For example, the outputs of operation-1 302 may be stored as a queue in some memory component and operation-2 302 may access the queue to process the stored data files. To this end, operation-N-1 302 may start processing on new data files even though operation-N might still be processing some previous data files.

It is to be noted that message pipeline 204, data pipeline 206, watermark pipeline 208, and inverse process pipeline 210 may be implemented as generic pipeline 300. That is, each pipeline may include operations 302 and the associated memory components.

Figure 4B:
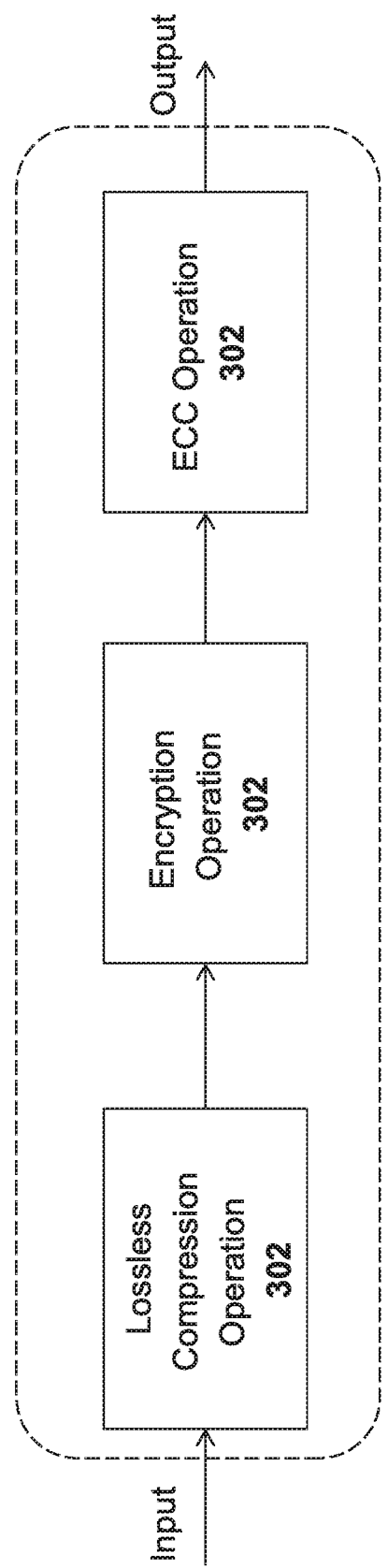

FIGS. 4A-4B illustrate a representative message pipeline 204 in accordance with various embodiments of the present disclosure. As shown, FIG. 4A illustrates message pipeline 204 including a lossless compression operation 302 and an error correction coding (ECC) operation 302, in accordance with various embodiments of the present disclosure. It is contemplated that message pipeline 204 may include other components such as memory components but have been omitted from FIG. 4A for the sake of simplicity.

The input to message pipeline 204 may be a queue containing message components and possibly a set of arguments. FIG. 4A depicts two operations, lossless compression operation 302 that may be configured to remove any redundancy contained in the message component itself and ECC operation 302 that may be configured to systematically add redundancy to increase the robustness of the watermark. It is to be noted that in certain embodiments, lossless compression operation 302 and ECC operation 302 may be configured to perform their operations based on different algorithms. Selection of a particular algorithm may depend on the set of arguments received at input.

In certain embodiments, if the input to message pipeline 204 does not have any set of arguments along with the message component, the message component may be passed through lossless compression operation 302 and ECC operation 302. Lossless compression operation 302 and ECC operation 302 may be configured to process the message component according to their default configuration. In other embodiments, a set of arguments is included to compress the message using Huffman encoding but the default configuration of lossless compression operation 302 to perform compression is LZMA. To this end, lossless compression operation 302 may be configured to switch its operation based on Huffman encoding.

It is contemplated that the other pipelines i.e. data pipeline 206, watermark pipeline 208, and inverse process pipeline 210 may offer similar functionality of changing the behavior, such as, for example, selecting a particular algorithm based on the set of arguments. In this way, digital watermarking system 200 is highly flexible since it can change its behavior on-demand.

In certain embodiments, in order to further modify the set of operations a pipeline may perform, digital watermarking system 200 may add or subtract an operation. With this said, FIG. 4B illustrates modified message pipeline 204, in accordance with various embodiments of present disclosure. In order to add functionality that randomizes the message, digital watermarking system 200 may add an additional operation such as encryption operation 302 in between lossless compression operation 302 and ECC operation 302.

It is contemplated that the other pipelines i.e. data pipeline 206, watermark pipeline 208, and inverse process pipeline 210 may be modified similarly, such as, for example, the addition of operations to pipelines based on new requirements. In this way, digital watermarking system 200 is highly adaptable since it can be extended to support new functionality in the face of unforeseen change.

With all that being said, digital watermarking system 200 provides an efficient watermarking system. In particular, both message pipeline 204 and data pipeline 206 may operate simultaneously on different components such as the message component and the data component. While watermark pipeline 208 begins embedding, message pipeline 204 and data pipeline 206 may fetch some more message components and data components and process them. Similarly, while inverse process pipeline 210 is processing its input, watermark pipeline 208 may fetch some more input to process.

Digital watermarking system 200 provides a flexible watermarking system. In particular, each pipeline in digital watermarking system 200 may include different types of operations and to some extent the functionality of each operation may be controlled by a set of arguments received as input.

Since new types of operations may be inserted into existing pipelines, digital watermarking system 200 provides an extensible watermarking system. Also, in certain embodiments, digital watermarking system 200 has an ability to scale by adding more of the same pipelines or more of the same operations inside a pipeline, thus digital watermarking system 200 provides a scalable watermarking system. By way of example, in certain embodiments, digital watermarking system 200 may add one or more of message pipeline 204, data pipeline 206, watermark pipeline 208, and/or inverse process pipeline 210 without limiting the scope of present disclosure. It is to be noted that all these pipelines may be different from each other and may be comprised of different operations making digital watermarking system 200 flexible.

Further, digital watermarking system 200 may be implemented for a variety of platforms, such as phone-based mobile devices, stand-alone servers, or even cloud-based environments made up of micro services, thereby digital watermarking system 200 provides a portable watermarking system.

It is to be noted that watermarks are more robust when embedded in the frequency domain. By way of example, if the data component input to the data pipeline 206 is an image file, transformations from spatial domain to frequency domain are computationally expensive operations. In particular, the dimensions of the image files are a major contributing factor to the workload of computing a 2-dimensional frequency transformation, where the dimensions of the image file are the width and height of the image file in pixels. In general, the spatial domain to frequency domain conversion of the image files may bottleneck the typical watermarking system when processing the image files having high resolution.

Figure 5:
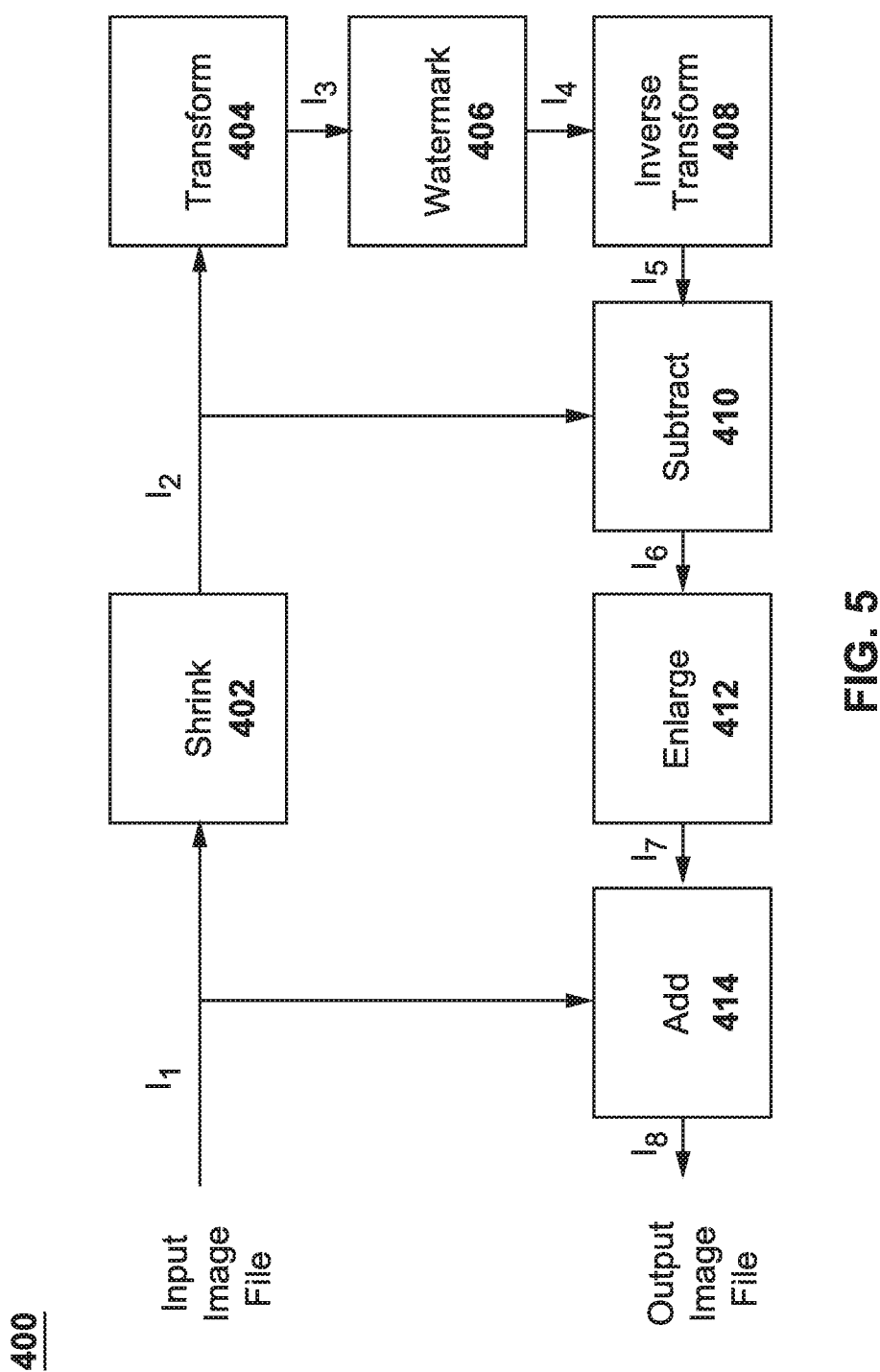
FIG. 5 illustrates a block diagram of a process implemented on digital watermarking system for a faster watermarking process, in accordance with various embodiments of the present disclosure.

With this said, digital watermarking system 200 provides a faster watermarking system in comparison to the typical digital watermarking system. FIG. 5 illustrates a block diagram of a process 400 implemented on digital watermarking system 200 for a faster watermarking process, in accordance with various embodiments of the present disclosure. It is contemplated that various task blocks illustrated in FIG. 5 may be implemented and executed over various pipelines associated with digital watermarking system 200.

As shown, process 400 begins at task block 402 where data pipeline 206 receives an image data file onto which a watermark is to be embedded. One or more operations 302 associated with data pipeline 206 (hereinafter referred to as data pipeline operations 302) may be configured to shrink/reduce the dimensions of the received image file. By way of example, if the original dimensions of the image file $I_1$ is 1920×1080 pixels, data pipeline operations 302 may shrink/reduce the dimensions of the image file $I_1$ to 500×480 pixels. The image file with the reduced dimensions may be represented as $I_2$. In certain embodiments, data pipeline operations 302 may create a copy of the original image file $I_1$ and reduced dimensions image file $I_2$ and may provide the copy of the original image file $I_1$ and reduced dimensions image file $I_2$ to the inverse process pipeline 210 for further processing.

At task block 404, data pipeline operations 302 may be configured to convert the image file $I_2$ from spatial domain to frequency domain represented as frequency domain representation file $I_3$. In certain embodiments, data pipeline operations 302 may use any suitable technique such as DFT, DCT, or the like. Selection of the technique may depend on the set of arguments. If there was no set of arguments provided at the input of data pipeline 206, data pipeline operations 302 may use a default technique. Data pipeline operations 302 may provide the frequency domain representation file $I_3$ to the watermark pipeline 208.

At task block 406, one or more operations 302 associated with watermark pipeline 208 (hereinafter referred to as watermark pipeline operations 302) may be configured to receive a message from message pipeline 204 to be embedded onto the frequency domain representation file $I_3$ received from data pipeline 206. Watermark pipeline operations 302 may use any suitable watermarking technique to embed the message onto the frequency domain representation file $I_3$.

Once the message is embedded onto the frequency domain representation file $I_3$, watermark pipeline operations 302 may provide the watermarked frequency domain representation file $I_4$ to inverse process pipeline 210.

At task block 408, one or more operations 302 associated with inverse process pipeline 210 (hereinafter referred to as inverse process pipeline operations 302) may be configured to convert watermarked frequency domain representation file $I_4$ from frequency domain to spatial domain represented as watermarked spatial domain image file $I_5$. At task block 410, inverse process pipeline operations 302 may then subtract the reduced dimensions image file $I_2$ from the watermarked spatial domain image file $I_5$ to extract the watermarked region, represented as extracted watermarked region $I_6$, from the watermarked spatial domain image file $I_5$. At task block 412, inverse process pipeline operations 302 may then increase the dimensions of the extracted watermarked region $I_6$ by using any suitable technique such as interpolation. In certain embodiments, the increase in the dimensions of the enlarged watermarked region $I_7$ may be equal to the dimensions of the original image file $I_1$. Finally, at task block 414, inverse process pipeline operations 302 may add the enlarged watermark region $I_7$ to the original image file $I_1$ to provide a watermarked image $I_8$.

Thus by virtue of process 400, digital watermarking system 200 may shrink an image file (i.e., reduce its dimensions) before it is transformed into the frequency domain. In so doing, digital watermarking system 200 saves computational effort to perform the frequency transformation, watermarking and inverse frequency transformation operations.

Certain watermarking algorithms rely on a differential encoding scheme in which two random pixels in the frequency domain of the image file are selected to modulate a bit of information. Since the pixels are selected randomly, such technique provides very little control over where a message is being embedded. Also, adjacent pixels, or pixels that are too close may interfere during various operations (e.g. interpolation) performed post watermarking process. Moreover achieving a robust watermark while maintaining imperceptibility has its own challenges. For example, embedding the watermark in the lower frequency components of the DFT of the image file makes it perceptible and embedding the watermark in the high frequency components of the DFT of the image file makes it less robust.

To this end, in certain embodiments, watermark pipeline 208 may use a modified differential encoding scheme. Instead of randomly selecting pixels, a modified differential encoding scheme, watermark pipeline 208, may be configured to select pixels that may lie on arcs for modulation. The selection of arcs may be highly parameterized to provide complete control over the watermark location. Controlling the location of the watermark implies control over the trade-off between imperceptibility and robustness.

Figure 6A:
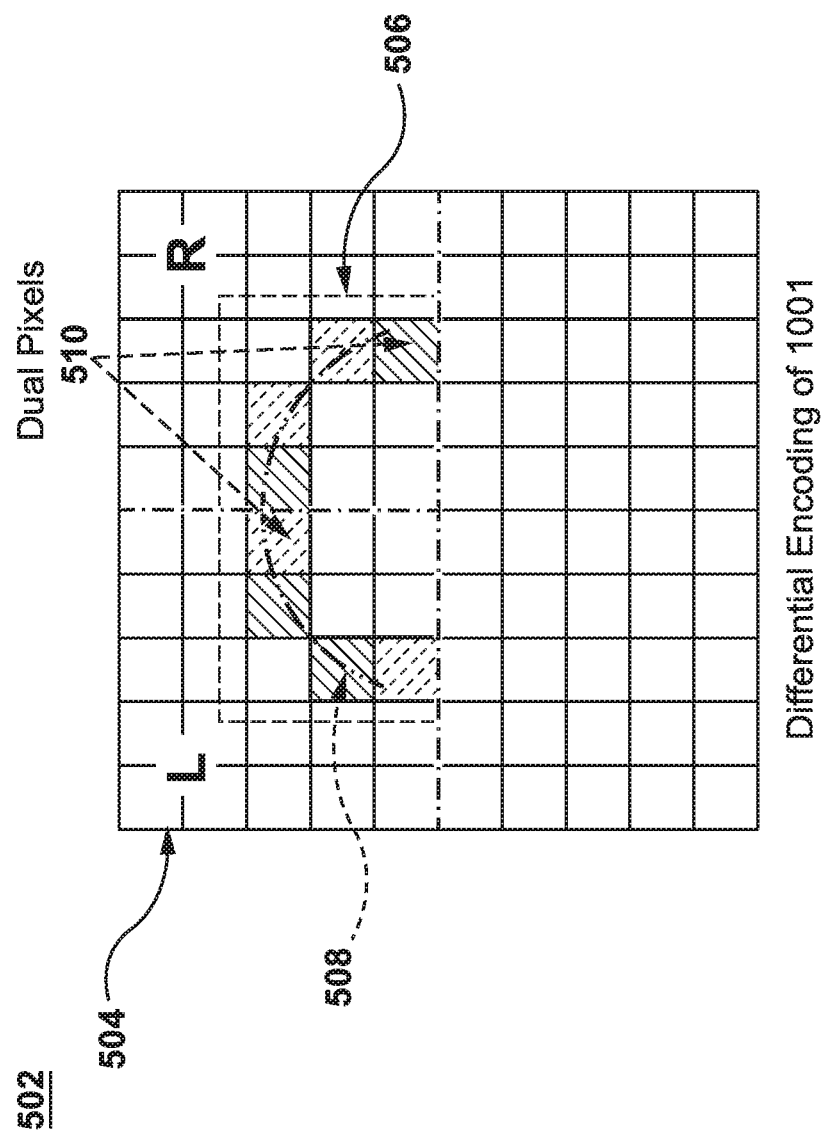
FIG. 6A illustrates an example of selecting and differential encoding pixels in frequency domain of an image file, in accordance with various embodiments of present disclosure.

FIG. 6A illustrates an example 502 of a modified differential encoding scheme where the pixels selected for modulation lie on an arc. As shown, example 502 illustrates a watermarked frequency domain representation file 504 of an image file. Watermark pipeline 208 may select pixels 506 around arc 508. Arc 508 may extend over two quadrants of the upper half of the frequency domain. The quadrants are labelled as right (R) and left (L). The placement of the arc in the frequency domain is typically in the middle range of frequencies, avoiding the very low frequencies (near the centre of the frequency domain matrix), which make the watermark visible, and the very high frequencies (near the corners of the frequency domain matrix), which make the watermark not robust. The placement of the arc is typically optimized such that a robust and imperceptible watermark is obtained.

A message may be encoded using one or more arcs. The longer the message, the larger the number of pixel pairs that need to be modulated. If a message does not fit on a single arc, in certain embodiments, another arc with a higher radius may be selected. If even that arc does not contain sufficient pixels to encode the rest of the message, another arc with a higher radius than the current one may be selected, and so on until the message is fully encoded. In certain embodiments, watermark pipeline 208 may have multiple configuration parameters that control the arc selection process, including the radius of the starting arc, distance between pixels within an arc, and distance between consecutive arcs or the like. Redundancy is another factor that may increase the number of arcs needed. Redundancy duplicates the message bits to make the watermark more robust. With a larger number of bits in the message, more number of arcs is required to be selected. To perform differential encoding, watermark pipeline 208 may use two pixels to encode each bit, one in the right quadrant and another in the left quadrant. These pixels are said to be "dual" of each other 506. A pixel in the left quadrant may be 90 degrees counter clockwise from its dual pixel in the right quadrant.

In example 502, a differential encoding of the bits 1001 has been illustrated. The bit 1 is to be encoded by modulating the selected pair of pixels 510 such that the right quadrant pixel has a larger value than its dual left quadrant pixel. This is illustrated as solid diagonal lines in the pixel of the right quadrant pixel represented by 510. A 0 bit is encoded in the opposite manner where the left quadrant pixel has a larger value.

Figure 6B:
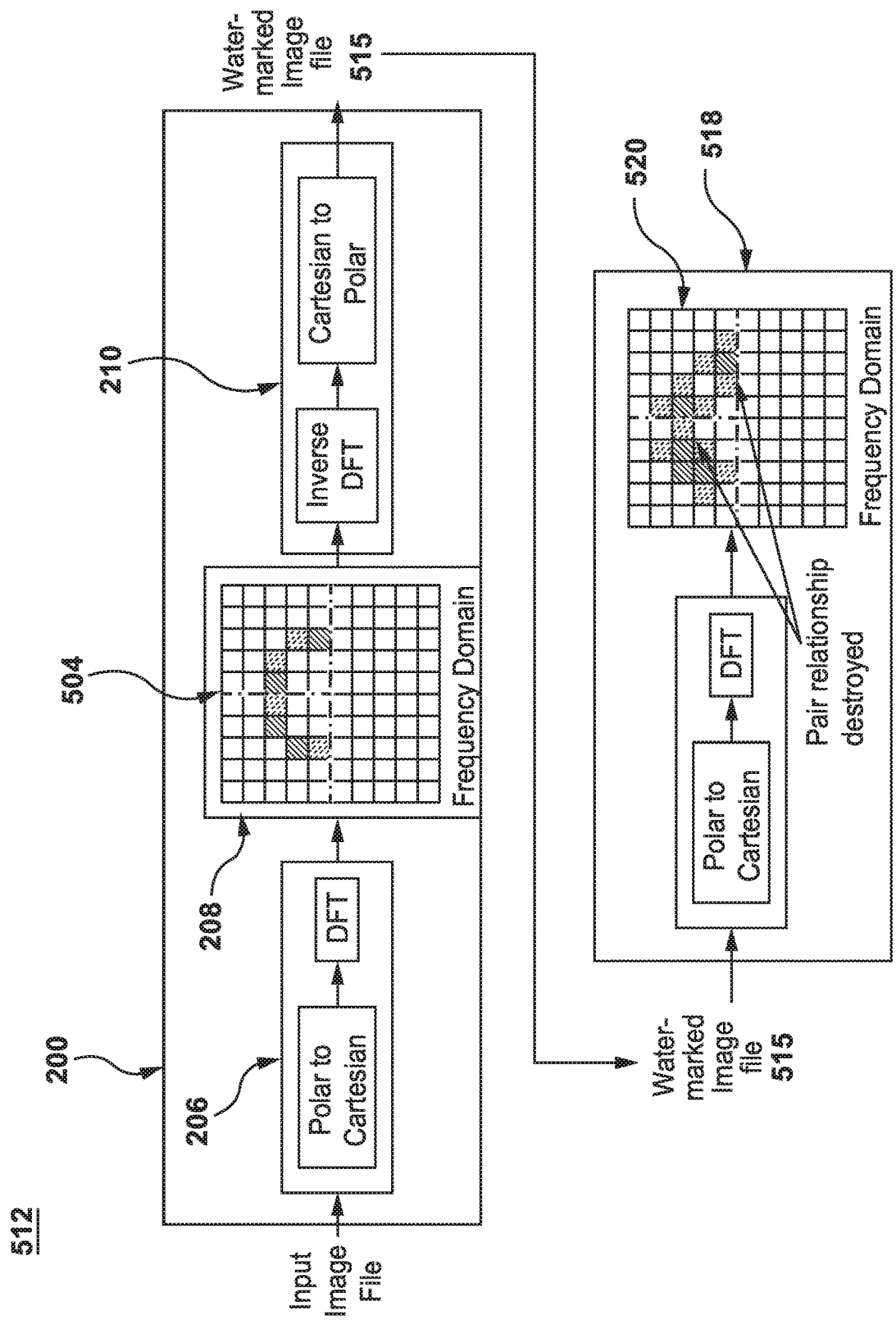
FIG. 6B illustrates a high level functional block diagram of an image transfer system configured to transfer a watermarked image file from the digital watermarking system to a digital watermark reading system, in accordance with various embodiments of present disclosure.

FIG. 6B illustrates a high level functional block diagram of an image transfer system 512 configured to transfer a watermarked image file from digital watermarking system 200 to a digital watermark reading system 518. As shown, image transfer system 512 includes digital watermarking system 200 configured to generate watermarked image file 515 and digital watermark reading system 518 is configured to extract or read the watermark from watermarked image file 515.

In certain embodiments, an input image file may be provided to digital watermarking system 200 and in particular to data pipeline 206. Data pipeline 206 may be configured to perform coordinate transformation on the input image file from polar to Cartesian coordinates. The coordinate transformation is performed by data pipeline 206 in order to achieve a watermark that is resistant to rotation attacks. Data pipeline 206 may be further configured to perform a frequency domain transformation on the coordinate transformed image file. In certain embodiments, data pipeline 206 may be configured to provide the frequency domain image file to watermark pipeline 208. Watermark pipeline 208 may be configured to generate watermarked frequency domain representation file 504 (as discussed above w.r.t. FIG. 6A). As shown, by way of example, the embedded message is the bits "1001". In certain embodiments, watermark pipeline 208 may provide watermarked frequency domain representation file 504 to inverse process pipeline 210. Inverse process pipeline 210 may be configured to convert watermarked frequency domain watermarked image file 504 into spatial domain and may perform coordinate transformation from Cartesian to polar coordinates to generate watermarked image file 515.

It is to be noted that since coordinate transformation from Cartesian to polar and vice versa is performed in a discrete domain, during the coordinate transformations interpolation may be performed when converting an image file between polar and Cartesian coordinates. This interpolation may cause the modulated pixels to interfere with each other and such interferences could potentially destroy the relationship between a pixel and its dual, causing the encoded bit to be lost.

In certain scenarios, if watermarked image file 515 is provided to digital watermark reading system 518, digital watermark reading system 518 may perform a coordinate transformation from polar to Cartesian coordinates. As previously discussed, during coordinate transformation, digital watermarked reading system 518 may perform interpolation. Thus, in certain scenarios, watermarked image file 515 may be interpolated twice, once during Cartesian to polar coordinate transformation by digital watermarking system 200 and second time during polar to Cartesian coordinate transformation by digital watermark reading system 518. Digital watermark reading system 518 may perform frequency transformation on the coordinate transformed watermarked image file to generate interpolated watermarked frequency domain file 520.

It is to be noted that since the selected pixel 506 were closely located while selecting in watermarked frequency domain representation file 504, during the coordinate transformations, due to the interpolation operation, dual pixel pair 510 may get corrupted and the differential encoded message watermarked onto watermarked frequency domain representation file 504 may not be recovered.

To counter this situation, in certain embodiments, watermark pipeline 208 may perform a separation operation on the selected pixels 506 to ensure that the pixels selected for the differential encoding do not get corrupted by interfering with each other due to coordinate transformations.

Figure 6C:
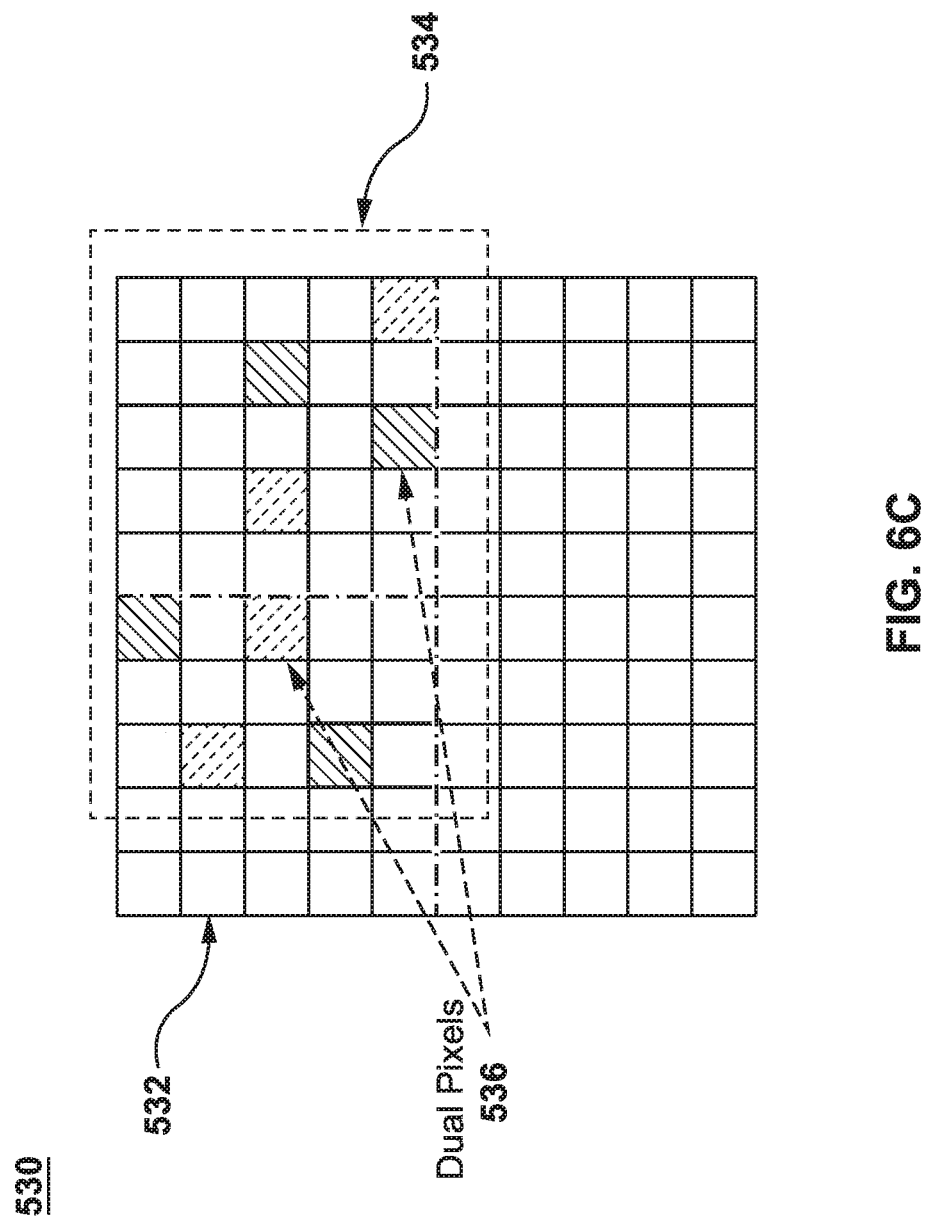
FIG. 6C illustrates an example of separated differential encoded pixels in frequency domain of the image file, in accordance with various embodiments of present disclosure.

FIG. 6C illustrates an example 530 of separated differential encoded pixels in frequency domain of the image file, in accordance with various embodiments of present disclosure. As shown, example 530 includes a watermarked frequency domain representation file 532 of an image file. In order to prevent pixels from interfering with each other, watermark pipeline 208 may select the pixel pairs on the arc such that they are separated from each other, as represented by 534, leading to separated dual pixels 536.

Figure 6D:
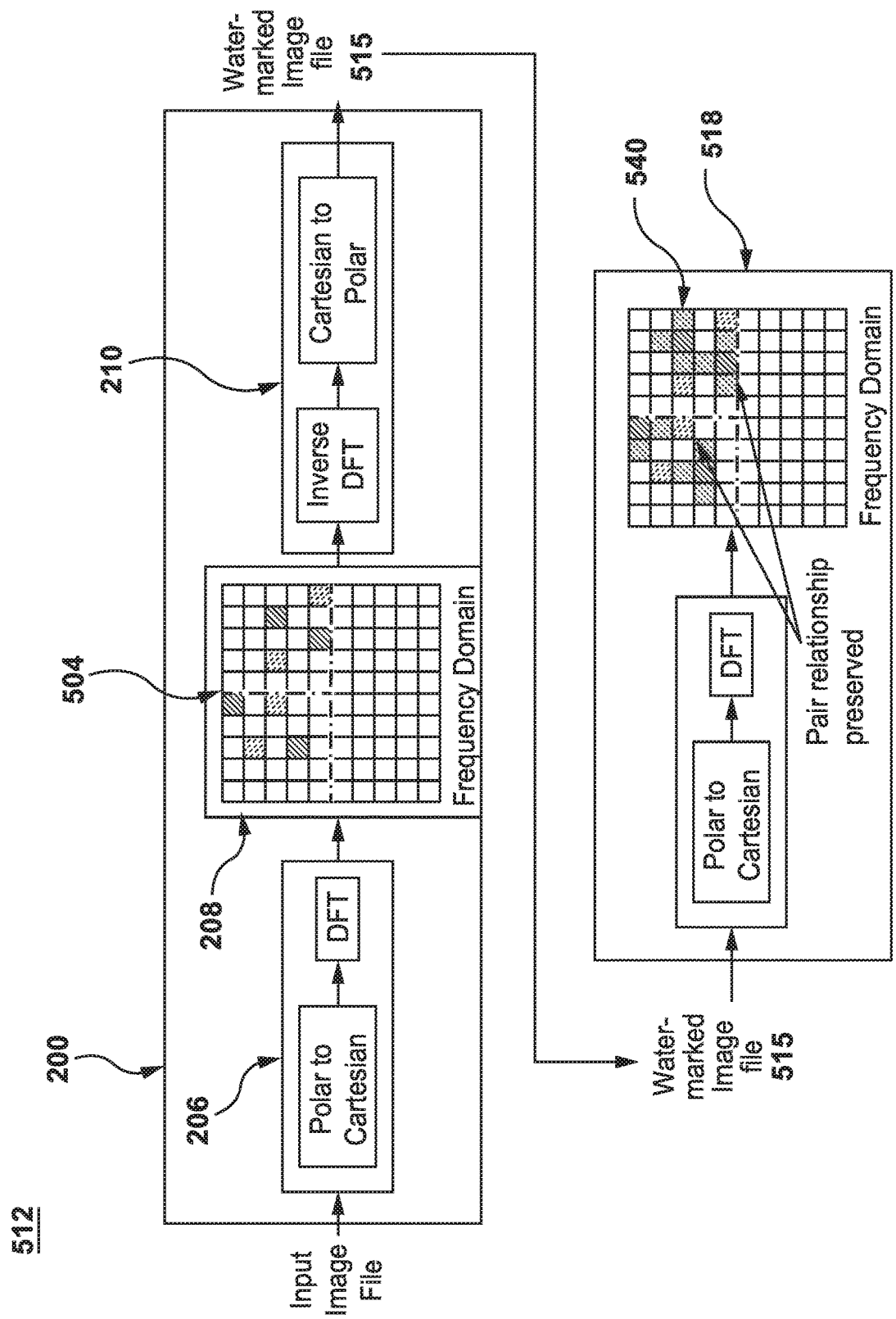
FIG. 6D illustrates another of the image transfer system, in accordance with various embodiments of present disclosure.

FIG. 6D illustrates an example where an input image file may be provided as input to digital watermarking system 200, in accordance with various embodiments of present disclosure. The watermark pipeline 208 may be configured to generate watermarked frequency domain representation file 532 including separated pixels 534. Also, as shown, interpolated watermarked frequency domain file 540 generated by image digital watermark reading system 518 preserves dual pixels 536.

To extract the differential code embedded in frequency domain representation file 532, in certain embodiments, digital watermark reading system 518 may be configured to traverse the associated pixels. In certain embodiments, to select the pixels to be traversed, digital watermark reading system 518 may incorporate a similar algorithm (e.g. separation operation) as performed by watermark pipeline 208 to separate the pixels. If the pixel value is greater than its dual pixel value, the decoded bit is equal to '1' else if the pixel value is smaller than its dual pixel value, the decoded bit is equal to '0'.

Further, the digital watermarks may be vulnerable to correlation attacks. In particular, statistical analysis is used to identify similarities amongst watermarked data files, watermark embedding algorithms may be reverse engineered, and tools may be developed to easily remove watermarks. Such correlation attacks may be circumvented by encrypting the message. An encryption algorithm may scramble the message to make it appear as random noise. Typically encryption algorithms used in digital watermarking systems use different keys to scramble the same message (e.g., the same user id is watermarked into multiple images) differently every time the same message is watermarked. Such techniques may be effective against correlation attacks, but requires the typical digital watermarking systems to manage many keys. Further such techniques may require different keys to decrypt every watermarked data file.

With this said, message pipeline 204 may include an operation (e.g. encryption operation 302 illustrated in FIG. 4B) configured to encrypt messages using the Paillier probabilistic encryption algorithm before the messages can be embedded into the data files. The Paillier probabilistic encryption algorithm may be used so that the same message encrypted multiple times may yield a different ciphertext. Therefore, by using the Paillier probabilistic encryption algorithm the total number of keys required to protect digital watermarking system 200 against correlation attacks may be reduced.

Paillier probabilistic encryption algorithm uses two keys: a public key for encryption, and a private key for decryption. Using Paillier probabilistic encryption algorithm for key generation, a unique public and private key pair are created for digital watermarking system 200. While the private key may be used to decrypt the message being watermarked, the public key may be configured along with the encryption operation 302. Every message that passes through encryption operation 302 may be randomized without changing the key.

Figure 7:
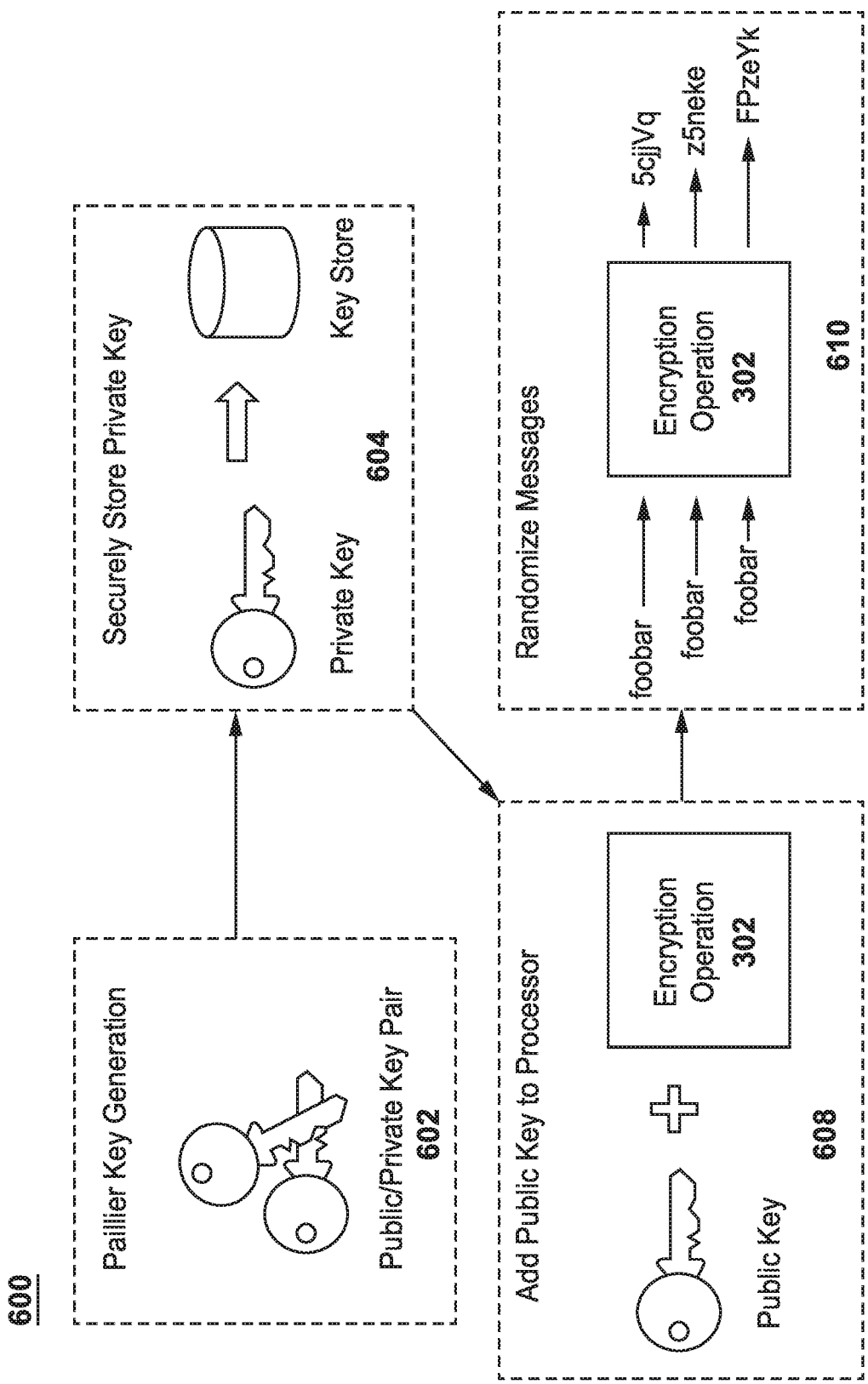
FIG. 7 illustrates a block diagram of a process implemented on the digital watermarking system for encrypting a message using Paillier probabilistic encryption algorithm, in accordance with various embodiments of present disclosure.

FIG. 7 illustrates a block diagram of a process 600 implemented on digital watermarking system 200 for encrypting a message using Paillier probabilistic encryption algorithm, in accordance with various embodiments of present disclosure. As shown, process 600 begins at task block 602, where digital watermarking system 200 may generate a Paillier public key for encryption of a message and Paillier private key for decryption of the message.

Process 600 proceeds to task block 604, where digital watermarking system 200 may store the Paillier private key in a key store. The key store may include memory components such as RAM(s) 104, computer readable storage media 108 or the like.

Process 600 then advances to task block 608, where digital watermarking system 200 may provide the Paillier public key to encryption operation 302 in message pipeline 204. Finally, at task block 610, encryption operation 302 may use the Paillier public key with the Paillier encryption algorithm to encrypt (or randomize) each message that passes through message pipeline 204. It is to be noted that any system which has access to the Paillier private key can decrypt the message.

Thus, by using process 600, digital watermarking system 200 may minimize the overall number of encryption keys. Process 600 only relies on one key (Paillier public key) to make sure all watermarked messages are randomized and uncorrelated. Furthermore, to decrypt any encrypted (i.e., randomized) message, only one extra key (Paillier private key) is required.

Figure 8A:
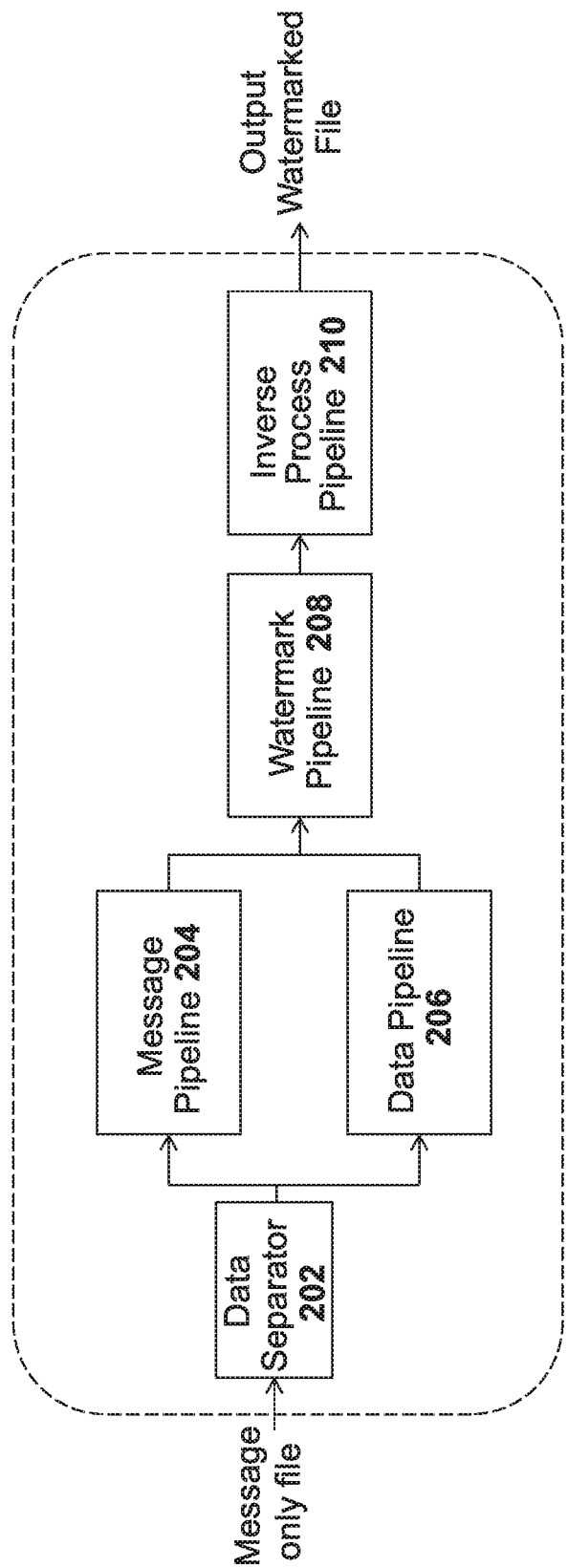
FIG. 8A illustrates another example of the digital watermarking system, in accordance with various embodiments of present disclosure.

FIG. 8A illustrates another example of an implementation of digital watermarking system 200, in accordance with various embodiments of present disclosure. As shown, in certain embodiments, digital watermarking system 200 may receive a digital data file containing the message component, the set of arguments associated with the message component, and an empty data component (e.g. an empty image file, an empty video file or an empty audio file). Data separator 202 may be configured to provide the message component and the associated set of arguments to message pipeline 204 and empty data component to data pipeline 206.

Message pipeline 204 may be configured to process the message in the message component in accordance with the set of arguments received in the digital data file. Message pipeline 204 may be configured to send the processed message to watermark pipeline 208. Data pipeline may be configured to process the empty data component and send the processed empty data component to watermark pipeline 208. It is to be noted that in certain embodiments, instead of forwarding the empty data component to data pipeline 206, data separator 202 may be configured to directly provide the empty image file to watermark pipeline 208.

Watermark pipeline 208 may be configured to embed the processed message onto the processed empty data component to generate an output watermarked file. In certain embodiments, watermark pipeline may store this output watermarked file in memory associated with digital watermark system 200. In other embodiments, watermark pipeline 208 may provide the output watermarked image to inverse process pipeline 210 for further processing. Inverse process pipeline 210 may be configured to update the output watermarked file in accordance with system requirements. By way of example, inverse process pipeline 210 may be configured to change the domain from frequency to spatial, in case the watermark embedding was performed in frequency domain, change the format of the output watermarked file for storage purpose (e.g. JPEG compression) or the like. Inverse process pipeline 210 may be configured to store the output watermarked file in memory associated with digital watermark system 200.

Figure 8B:
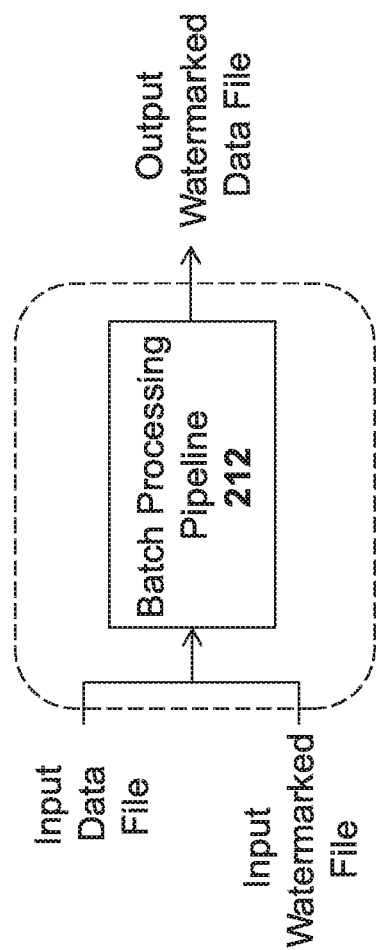
FIG. 8B illustrates a high level functional block diagram of a batch processing pipeline, in accordance with various embodiments of present disclosure.

In certain embodiments, digital watermark pipeline 200 may further include a batch processing pipeline 212. FIG. 8B illustrates a high level functional block diagram of batch processing pipeline 212, in accordance with various embodiments of present disclosure. As shown, batch processing pipeline 212 may be configured to receive an input data file (e.g. an image file, an audio file or a video file) and may fetch the output watermarked file stored in memory associated with digital watermarking system 200. Batch processing pipeline 212 may be configured to mix the output watermarked file and the input data file.

In certain embodiments, the input data file is an image file and the dimensions of the output watermarked file are different from the input image file. To this end, in certain embodiments, prior to inputting the input image file to batch processing pipeline 212, the input image file may be provided to data pipeline 206 to change the dimensions of the input image file in accordance with the dimensions of the output watermarked file. In other embodiments, inverse process pipeline 210 may change the dimensions of the output watermarked file in accordance with the dimensions of the input image file. In yet another embodiment, the batch processing pipeline 212 may be configured to change the dimensions of the input image file in accordance with the dimensions of the output watermarked file or vice versa.

Thus, if the same watermark is to be embedded on different images, the batch processing pipeline 212 may have a much lighter computational workload per data file processed. Thus by virtue of batch processing pipeline 212, digital watermarking system 200 may provide a fast watermarking system.

Figure 9:
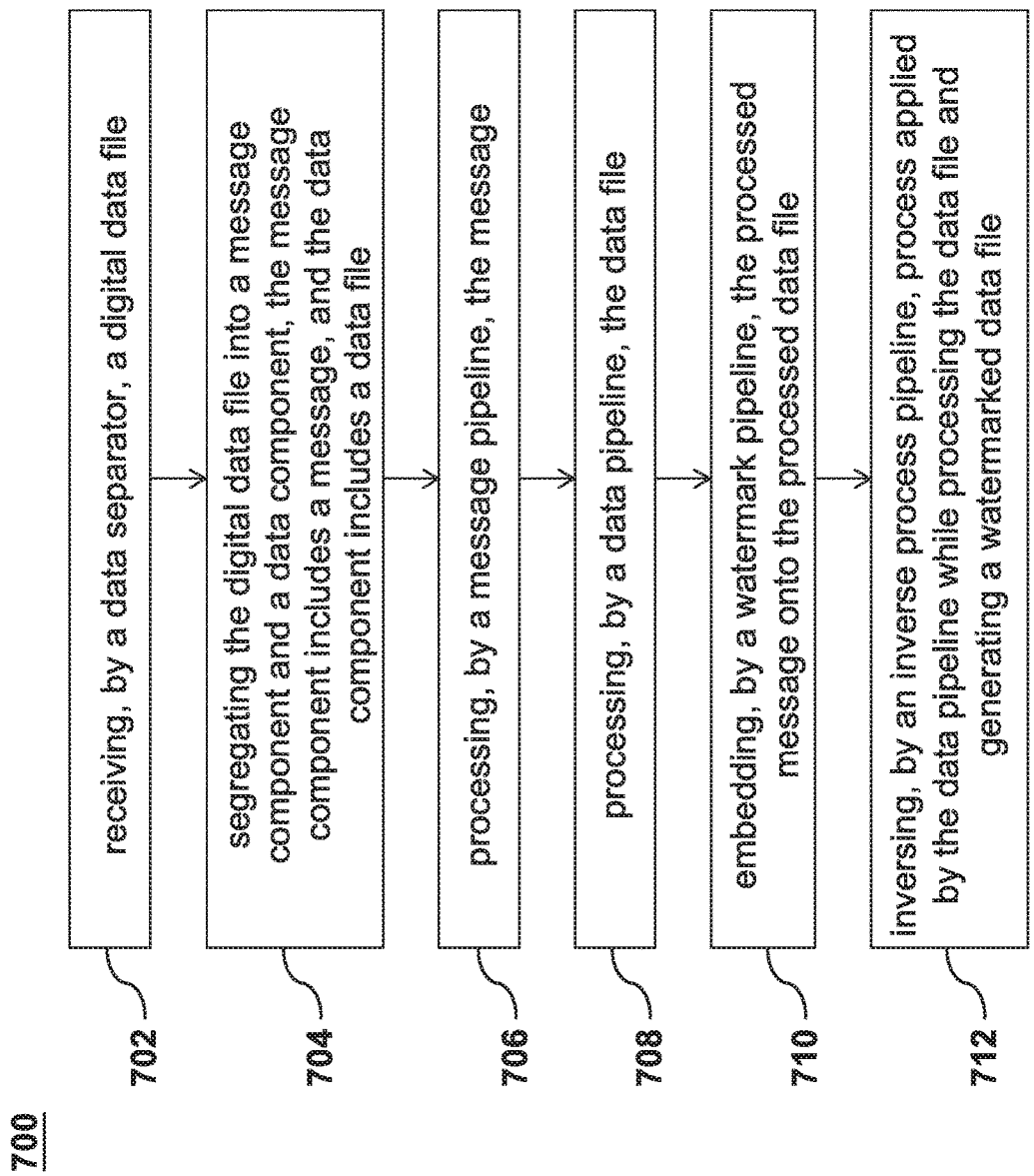
FIG. 9 depicts a flowchart representing a process corresponding to a digital watermarking method implemented on the digital watermarking system, in accordance with various embodiments of the present disclosure.

FIG. 9 depicts a flowchart representing a process 700 corresponding to a digital watermarking method implemented on digital watermarking system 200, in accordance with various embodiments of the present disclosure. As shown, process 700 begins at step 702 where data separator 202 receives a digital data file. Process 700 advances at step 704 where data separator 202 segregates the digital data file into a message component and a data component. The message component includes a message and the data component includes a data file.

Process 700 proceeds to step 706 where message pipeline 204 processes the message in the message component. As previously noted, message pipeline 204 may be configured to process the message component by performing various operations related to preparing a message for watermarking. Examples of such operations may include but are not limited to compression, encryption, encoding or the like. In certain non-limiting steps, Paillier encryption may be added to the pipeline to randomize the message.

Process 700 proceeds to step 708 where the data pipeline 206 processes the data file. As previously discussed, data pipeline 206 may be configured to process the data component by performing various operations on the data components. By way of example, if the data component is an image file, data pipeline 206 may be configured to deconstruct the image file into a state suitable for watermarking. For example, an image file may be converted from RGB (red, green, blue) colour space to grayscale then transformed to the frequency domain before embedding the message. In certain non-limiting steps, the data pipeline may shrink/ reduce the dimensions of the original input image and then perform various operations such as transformation, watermarking or the like on the reduced dimensions image.

Process 700 advances to step 710, where the watermark pipeline 208 embeds the processed message file onto the processed data file.

Finally, at step 712, inverse process pipeline inverses any transformation applied inside the data pipeline 206. By way of example, inverse process pipeline 210 may transform the image files from the frequency domain to the spatial domain and converting from grayscale to RGB. In certain non-limiting steps, inverse process pipeline 210 may extract the watermark portion from the spatial domain image, enlarge the extracted watermark portion and add the enlarged watermark portion to the original image.

It is to be understood that the operations and functionality of digital watermarking system 200, constituent components, and associated processes may be achieved by any one or more of hardware-based, software-based, and firmware-based elements. Such operational alternatives do not, in any way, limit the scope of the present disclosure.

It will also be understood that, although the embodiments presented herein have been described with reference to specific features and structures, it is clear that various modifications and combinations may be made without departing from such disclosures. The specification and drawings are, accordingly, to be regarded simply as an illustration of the discussed implementations or embodiments and their principles as defined by the appended claims, and are contemplated to cover any and all modifications, variations, combinations or equivalents that fall within the scope of the present disclosure.

What is claimed is:

1. A digital watermarking system comprising:
    a data separator configured to receive a digital data file and segregate the digital data file into a message component and a data component, in which the message component includes a message, and the data component includes a data file;
    a message pipeline configured to process the message;
    a data pipeline configured to process the data file;
    a watermark pipeline configured to embed the processed message file onto the processed data file; and
    an inverse process pipeline configured to inverse the process applied by the data pipeline while processing the data file and generate a watermarked data file.

2. The digital watermarking system of claim 1, wherein the digital data file further includes a set of arguments, the set of arguments specify at least one of:
    a processing criteria for the message pipeline to process the message,
    a processing criteria for the data pipeline to process the data file,
    a processing criteria for the watermark pipeline to embed the processed message file onto the processed data file, or
    a processing criteria for the inverse process pipeline to inverse process applied by the data pipeline while processing the data file.

3. The digital watermarking system of claim 2, wherein:
    the message pipeline is further configured to process the message in accordance with the set of arguments,
    the data pipeline is further configured to process the data file in accordance with the set of arguments,
    the watermark pipeline is further configured to embed the processed message file onto the processed data file in accordance with the set of arguments, and
    the inverse process pipeline is further configured to inverse process applied by the data pipeline while processing the data file in accordance with the set of arguments.

4. The digital watermarking system of claim 1 is further configured to add or remove an operation in the message pipeline, the data pipeline, the watermark pipeline or the inverse process pipeline.

5. The digital watermarking system of claim 1, wherein the message pipeline is further configured to encrypt the message using the Paillier probabilistic encryption algorithm.

6. The digital watermarking system of claim 5, wherein the message pipeline uses a public key to encrypt the message.

7. The digital watermarking system of claim 1, wherein the data file includes at least one of a video file, an audio file or an image file.

8. The digital watermarking system of claim 7, wherein if the data file is the image file:
    the data pipeline is further configured to:
        create a copy of the original image file and provide the copied image file to the inverse process pipeline,
        shrink the dimensions of the original image file, create a copy of the shrunk image file and provide the copied shrunk image file to the inverse process pipeline, and
        convert the shrunk image file from spatial domain to frequency domain and provide the frequency domain representation file to the watermark pipeline;

the watermark pipeline is further configured to:
embed the processed message file onto the frequency domain representation file, generate a watermarked frequency domain representation file, and provide the watermarked frequency domain representation file to the inverse process pipeline; and the inverse process pipeline is further configured to:
convert the watermarked frequency domain representation file from frequency domain to spatial domain to generate a watermarked spatial domain shrunk image file,
subtract the copied shrunk image file from the watermarked spatial domain image file to extract a watermarked region from the watermarked spatial domain shrunk image file, and
increase the dimensions of the extracted watermarked region to generate an enlarged watermark region, and add the enlarged watermark region to the original image file.

9. The digital watermarking system of claim 7, wherein:
the data pipeline is further configured to:
converting the image file from polar to Cartesian coordinate;
convert the coordinate transformed image file from spatial domain to frequency domain and provide the frequency domain representation file to the watermark pipeline;
the watermark pipeline is further configured to:
select an arc in top left and right quadrants of the frequency domain representation file,
select pixels around the arc in accordance with a separation operation; and
perform differential encoding on the selected pixels.

10. The digital watermarking system of claim 9, wherein for each bit to be encoded:
the digital watermark pipeline uses two pixels from the selected pixels, a first pixel from the top right quadrant and second pixel from the top left quadrant, and
the first pixel and the second pixel are dual of each other and are separated by 90 degrees counter clockwise away from each other.

11. The digital watermarking system of claim 1, wherein the data file is an empty data file.

12. The digital watermarking system of claim 11 further includes a batch processing pipeline configured to mix the watermarked data file to a second data file, the second data file includes at least one of an image file, a video file or an audio file.

13. A digital watermarking method comprising:
receiving, by a data separator, a digital data file;
segregating the digital data file into a message component and a data component,
the message component includes a message, and
the data component includes a data file;
processing, by a message pipeline, the message;
processing, by a data pipeline, the data file;
embedding, by a watermark pipeline, the processed message file onto the processed data file; and
inversing, by an inverse process pipeline, process applied by the data pipeline while processing the data file and generating a watermarked data file.

14. The digital watermarking method of claim 13, wherein the digital data file further includes a set of arguments, the set of arguments specify at least one of:
a processing criteria for the message pipeline to process the message,
a processing criteria for the data pipeline to process the data file,
a processing criteria for the watermark pipeline to embed the processed message file onto the processed data file, or
a processing criteria for the inverse process pipeline to inverse process applied by the data pipeline while processing the data file.

15. The digital watermarking method of claim 14, wherein:
processing the message, by the message pipeline, is in accordance with the set of arguments,
processing the data file, by the data pipeline, is in accordance with the set of arguments,
embedding the processed message file onto the processed data file, by the watermark pipeline, is in accordance with the set of arguments, and
inversing the process applied by the data pipeline while processing the data file, by the inverse process pipeline, is in accordance with the set of arguments.

16. The digital watermarking method of claim 13 further comprising adding or removing an operation in the message pipeline, the data pipeline, the watermark pipeline or the inverse process pipeline.

17. The digital watermarking method of claim 13, wherein the message is encrypted using the Paillier probabilistic encryption algorithm.

18. The digital watermarking method of claim 17, wherein encrypting the message uses a public key.

19. The digital watermarking method of claim 13, wherein the data file includes at least one of a video file, an audio file or an image file.

20. The digital watermarking method of claim 19, if the data file is the image file, further comprises:
creating a copy of the original image file and providing the copied image file to the inverse process pipeline,
shrinking the original image file, creating a copy of the shrunk image file and providing the copied shrunk image file to the inverse process pipeline, and
converting the shrunk image file from spatial domain to frequency domain and providing the frequency domain representation file to the watermark pipeline;
embedding the processed message file onto the frequency domain representation file, generating a watermarked frequency domain image file, and providing the watermarked frequency domain representation file to the inverse process pipeline; and
converting the watermarked frequency domain representation file from frequency domain to spatial domain to generate a watermarked spatial domain image file,
subtracting the copied shrunk image file from the watermarked spatial domain image file to extract a watermarked region in the watermarked spatial domain image file, and
increasing the dimensions of the extracted watermarked region to generate an enlarged watermark region, and adding the enlarged watermark region to the original image file.

21. The digital watermarking method of claim 19 further comprises:
converting the image file from polar to Cartesian coordinate;
converting the coordinate transformed image file from spatial domain to frequency domain and providing the frequency domain representation file;
selecting an arc in top left and right quadrants of the frequency domain image file;

selecting pixels around the arc in accordance with a separation operation; and performing differential encoding on the selected pixels.

22. The digital watermarking method of claim 21, wherein for each bit to be encoded:

two pixels from the selected pixels are used, a first pixel from the top right quadrant and second pixel from the top left quadrant, and the first pixel and the second pixel are dual of each other and are separated by 90 degrees counter clockwise away from each other.

23. The digital watermarking method of claim 13, wherein the data file is an empty data file.

24. The digital watermarking system of claim 23 further includes mixing, by a batch processing pipeline, the watermarked data file to a second data file, the second data file includes at least one of an image file, a video file or an audio file.

* * * * *